(12) United States Patent
Weinberg (10) Patent No.: US 6,262,558 B1
(45) Date of Patent: Jul. 17, 2001

(54) SOLAR ARRAY SYSTEM

(76) Inventor: Alan H Weinberg, 5 Bowden Rise, Seaford, East Sussex BN25 2HZ (GB)

( * ) Notice: Subject to any disclaimer, the term of this patent is extended or adjusted under 35 U.S.C. 154(b) by 0 days.

(21) Appl. No.: 09/196,948

(22) Filed: Nov. 20, 1998

(30) Foreign Application Priority Data

Nov. 27, 1997 (GB) .................................................. 9725128

(51) Int. Cl.$^7$ .................................................. H01M 10/46
(52) U.S. Cl. .................................................. 320/101; 136/291
(58) Field of Search .................................... 320/101, 102, 320/116, 119, 120, 121; 136/244, 291, 293; 323/906

(56) References Cited

U.S. PATENT DOCUMENTS

| | | |
|---|---|---|
| 3,696,286 | 10/1972 | Ule . |
| 4,175,249 | * 11/1979 | Gruber . |
| 4,186,336 | 1/1980 | Weinberg et al. . |
| 4,604,567 | * 8/1986 | Chetty .................................. 136/293 |
| 5,327,071 | 7/1994 | Frederich et al. . |

FOREIGN PATENT DOCUMENTS 60-164821   8/1985   (JP) .

OTHER PUBLICATIONS

O'Sullivan and Weinberg, "The sequential switching shunt regulator S$^3$R", proceedings of the Third ESTEC power conditioning seminar, pp. 123–131, 1977, No Month.

Teulings et al., "A maximum power point tracker for a regulated power bus", proceedings for the European Space Power Conference, pp. 93–97, Aug. 1993.

Poncin, A., "Advanced power conditioning using a maximum power point tracking system", Spacecraft Electrical Power Conditioning Seminar, Frascati, Italy, pp. 75–86, 1974, No Month.

* cited by examiner

Primary Examiner—Edward H. Tso
(74) Attorney, Agent, or Firm—John L. Lee (57) ABSTRACT

A solar array system is described having a solar array 31 divided into sections 33, 35, 37, 39 connected by switches 43, 45, 47, 49 to an output bus 51. The switches can be opened and closed so the system operates at its maximum power point. The system can be used, for example, to power satellites.

26 Claims, 10 Drawing Sheets

SOLAR ARRAY SYSTEM

FIELD OF THE INVENTION

This invention relates to a solar array (SA) system, and in particular to a solar array system suitable for use in apparatus such as a space satellite requiring the maximum available array power from a solar array subject to variations in temperature and illumination, and deterioration during its lifetime.

BACKGROUND OF THE INVENTION

A satellite power-system generally consists of a solar array (which is a set of solar cells connected in series and parallel) to generate electrical energy from sunlight and provide the source to power the spacecraft. The on-board users of this power are the housekeeping subsystems (required to operate the spacecraft, such as the attitude control and the telecommand) and the actual payload (the purpose of the mission e.g. telephone, television, scientific, etc). In addition, a certain power is required to charge the storage battery so that if, at any time, the user power exceeds the solar array power the excess can be provided by the battery. This can happen for example during eclipse when there is no solar array power or during a period of peak power demand. The power capacity of a solar array depends linearly on its area and can be expressed in watts per square metre. Over its lifetime, this power-capacity degrades with radiation effects, so that its size is generally based upon its power capacity at end-of-life. Because the solar array represents a very high proportion of the financial cost and mass of a satellite, any technique to reduce these is most important.

Figure 1:
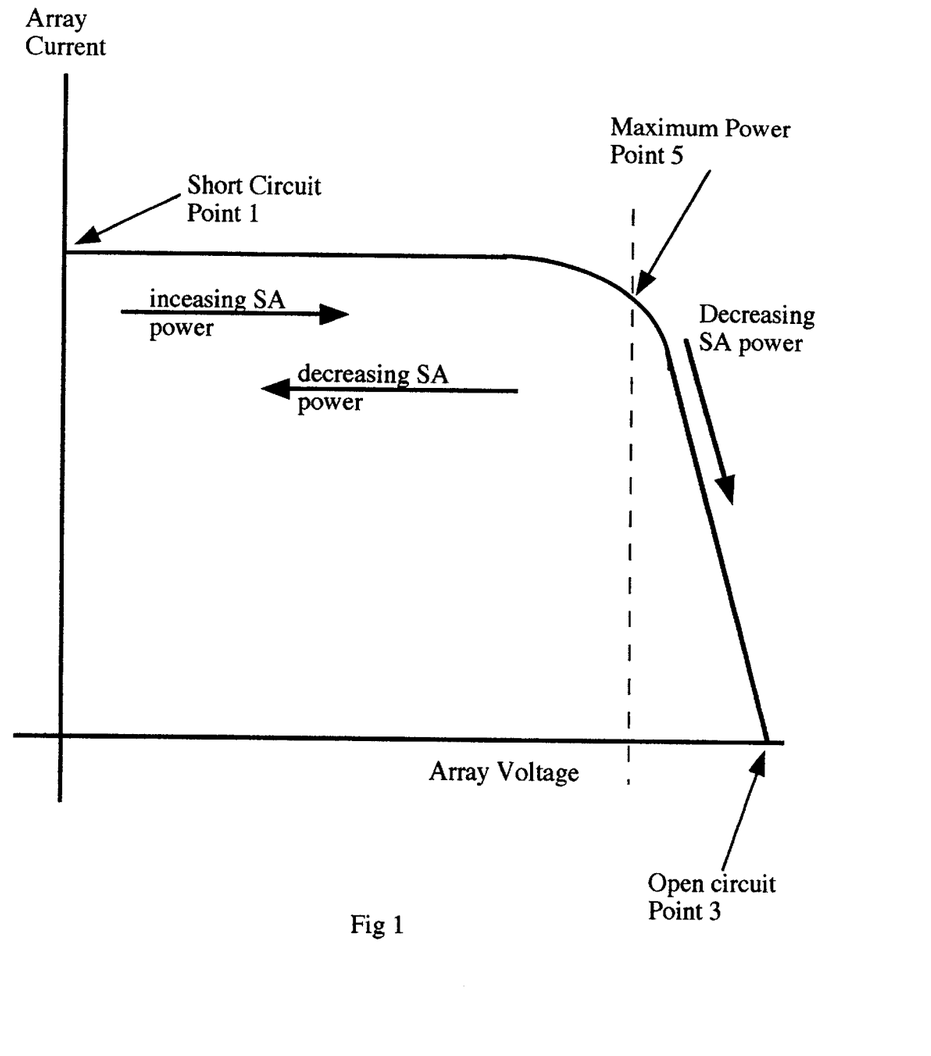
FIG. 1 shows a typical I-V characteristic for a solar array at a fixed temperature and illumination.

The current-voltage (I-V) characteristic of a solar array is shown in FIG. 1. The short circuit point 1 represents the short circuit situation in which the short circuit current $I_{sc}$ is output. The open circuit point 3 represents the situation when the open circuit voltage $V_{oc}$ is output. At some intermediate position 5, the solar array operates to produce its maximum power, at the maximum power point (MPP).

One system for regulating the voltage of a solar array is known from U.S. Pat. No. 4,186,336 (Weinberg et al). This patent describes a low dissipation series regulator that maintains a constant voltage at a load by sequentially switching elements of a solar array, as will now be explained.

In this prior art, the solar array is divided into a plurality of sections, each of which can be sequentially switched by a single control voltage. Each solar array switch is driven by a comparator with two predetermined hysteresis thresholds. The two thresholds are at very similar voltage levels, but are different for every comparator, so that as the control voltage varies the switches open or close at different voltages so that the number of solar array elements connected to the output is-varied as a function of control voltage. This control voltage is generated by the output from a differential amplifier which amplifies the difference between a signal proportional to the solar array output voltage and a reference voltage. By this means the output voltage is maintained at a predetermined value. A smoothing capacitor is connected across the output. In use, a load is connected to the output, and draws a current tending to discharge the capacitor. The solar array elements act as current sources tending to charge the capacitor, and the correct number of elements are sequentially switched into operation to maintain the capacitor at a predetermined constant voltage. The other solar array elements do not supply power.

However, in this technique the solar array will often be operated far from its maximum power point, since the output voltage is constant and yet the voltage at the maximum power point is highly variable. Thus, the maximum potential power of the solar array cannot be utilised.

Methods of operation of a solar array at its maximum power point (MPP) are described in "A maximum power point tracker for a regulated power bus", Teulings et al., Proceedings of the European Space Power conference pages 93–97, Graz, Austria, August 1993, and in "Advanced power conditioning using a maximum power point tracking system", A.Poncin, Spacecraft electric power conditioning seminar, Frascati, Italy, May 1974, pages 75–86.

The solar array must be designed to supply power equal to the average power demand including peaks of the demand taken over the total eclipse-sunlight cycle.

Figure 2:
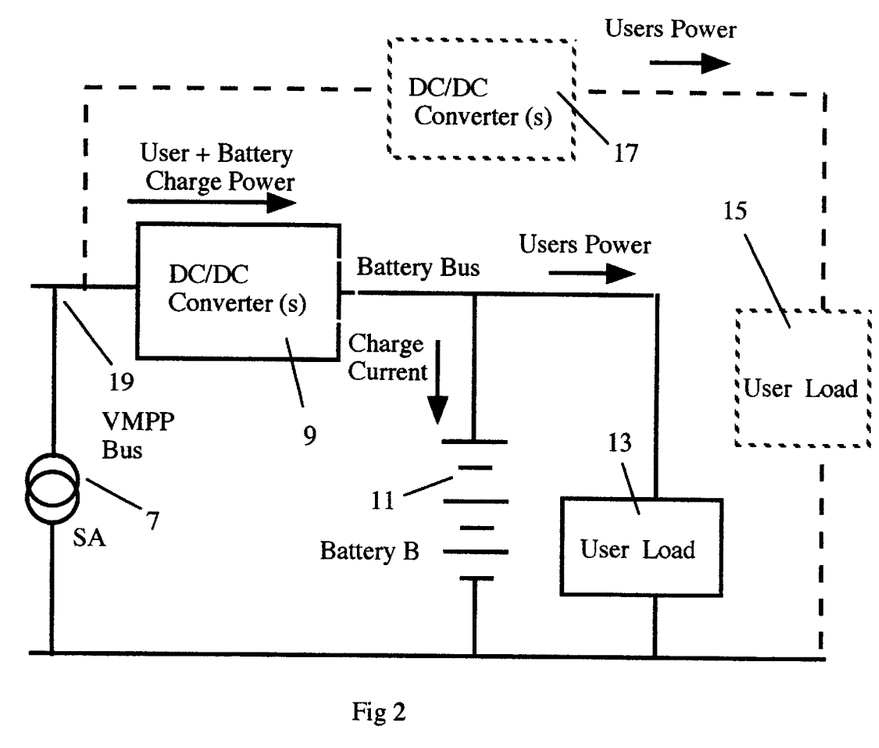
FIG. 2 shows a schematic diagram of a prior art MPP system.

In most prior art techniques the solar array is controlled to be at its MPP by variation of the power required to charge or discharge the on-board storage battery of the satellite. By this means the peak power demand can be supplied from the battery and the battery recharged when this peak demand disappears. To illustrate the principle a very basic scheme for achieving this is shown in FIG. 2. The DC/DC converter or converters 9 produce the current to charge the battery 11 and supply the user load 13; this power comes from the solar array 7 via the bus 19. Normally there is more than one such converter, although for simplicity only one is shown in FIG. 2. By variation of the battery charge current and discharge current the solar array can be regulated to operate at its MPP.

However, the MPP technique of the prior art has the following problems:

a) An on-board battery is required, of sufficient capacity to absorb the excess power of the solar array and supply the peak load demand. This can result in a battery size and cost much larger than that required for eclipse operation.

b) It may not be possible to vary the current into the battery according to the requirements of MPP tracking. For example, when the battery is being reconditioned, or is fully charged, it is effectively disconnected from the solar array. Under these conditions the MPP tracker cannot store the excess power of the solar array, which means the solar array voltage is not controlled to be at the MPP and will be forced to operate near to the open circuit voltage of the solar array. This solar array open circuit voltage can be very high especially for an array at low temperature when just emerging from eclipse and at beginning of life (between 2 to 3 times nominal). The result is that any pieces of equipment connected to this solar array voltage (i.e. battery charge DC/DC converters) have to be rated for a large voltage variation at their input. The impact of this is a lowering of the efficiency which together with the higher voltage rating required by the components of this equipment results in them having a higher mass and cost.

c) The DC/DC converter(s) used to charge the battery and supply the load have to be rated for the total spacecraft and battery recharge power. This results in higher mass and cost than a converter that only handles the battery recharge power.

d) The transient output impedance of the MPP Bus 19 is relatively high for fast load changes because the technique of regulating this Bus has to be slow. This is due to the low frequency filters required for the DC/DC converter used to implement MPP tracking. This means it is difficult to connect the user directly to the VMPP Bus without using special methods (such as additional DC/DC converters). This in turn means that normally all the user loads are connected across the storage battery resulting in problems (e) and (f).

e) The battery has a relatively large output impedance (although not as large as the solar array MPP bus) and since the battery is the common point of all the loads, noise problems can result due to high ripple voltage.

f) The peak power demand must come from the battery resulting in a lower battery life due to more charge/discharge cycles, and the requirement for the battery to be able to supply higher peak current.

g) The control techniques required to perform the function of keeping the solar array at its MPP and the battery properly charged is combined in the DC/DC converter which results in a control of considerable complexity.

The example of prior art given is the very simple case of supplying the users from a battery,; there are other techniques where the user is also supplied from the MPP bus through converters as shown dotted in FIG. 2 (an extra converter 17 to supply the second load 15). These extra converters are used to overcome some of the problems discussed above for the prior art but the penalty paid for these additions is mass, cost and complexity. In all these configurations, the same principle is used for MPP tracking. This principle is to keep (whenever possible) the solar array operating at its MPP, by variation of the charge and discharge current of the battery and variation of the power demanded by the user's loads.

There is thus a need for a solar array system that reduces the disadvantages of the prior art systems discussed above.

SUMMARY OF THE INVENTION

According to a first aspect of the invention there is provided a solar array system, comprising a solar array having a plurality of array sections, the array sections having a maximum output power (as a function of the output voltage) at the maximum power point, an output bus, a plurality of switches switchably connecting respective array sections to the output bus, and a switch controller for controlling the switches to vary the number of array sections connected to the output bus, to keep the solar array sections connected to the bus substantially at their maximum power point.

The invention works with a different principle to the prior art. It controls the amount of power output by the solar array power source to the load by fast switching of discrete sections of the solar array. By matching this (controlled) solar array power to the load, the solar array sections that are supplying power can be controlled to operate at their MPP. The total solar array is not necessarily supplying its maximum power, but should the load require more power, other sections can be switched to provide this power demand up to the full solar array (MPP) capability. In this case all sections will be connected to the user load and operating substantially at their MPP.

This arrangement has a number of advantages over the prior art. The maximum power is always available simply by closing additional switches if required to meet a transient power demand.

With the prior art solution, any power not required by the user is stored in a battery, whilst in the case of the invention MPP tracking can be achieved without the use of a storage battery.

The complete system also benefits from the modular design in that the solar array has a plurality of sections. The design is very flexible: a single design can be used in a number of applications by varying the number of sections. Failure of one section does not appreciably affect the steady-state DC voltage or ripple when integral feedback control is used in the error amplifier. The function of the failed section will automatically be taken over by one of the other sections without the need of any special protection circuit or logic.

Preferably, the system according to the invention is used to power a satellite. However, the invention can also be used in other solar array powered applications where a number of constant current sources needs to be controlled.

In prior art MPP techniques, excess solar array power is dissipated within the electronic circuit and the battery, i.e. within a satellite body. In contrast, in the present invention solar array power which is not required is mostly dissipated in the solar array (outside the satellite body). This diminishes unnecessary heating of the satellite.

Embodiments of this invention allow the extraction of the maximum amount of power from a given solar array by operating at its Maximum Power Point (MPP), without requiring the same control circuit complexity as in prior art arrangements.

The system does not require a clock or any clockphasing circuitry. This is a major advantage when designing for single component failures.

The system also has a minimal mass and maximum efficiency (no special DC/DC converter is required to control the MPP), and the higher efficiency achieved means that this invention requires fewer solar array cells than in prior art arrangements.

Unlike prior art arrangements, the MPP operation of the present invention is not dependent on the state of charge of a battery. This makes it simpler to design and operate. Indeed, the present invention does not require a battery for its operation.

The technique of controlling the solar array voltage output by switching on and off discrete sections of the solar array, can be done in many ways, but as an example, the well established technique known as the Sequential Switching Shunt Regulator ($S^3R$), is given. Prior art applications of this technique regulate the array to give constant output voltage. The solar array system according to the invention regulates the array sections that supply power to the spacecraft to operate at their MPP.

Accordingly, the switching regulator is preferably a sequential switching shunt regulator in which the plurality of switches can be controlled by a control voltage output by the maximum power point evaluation system. In a sequential switching shunt regulator each of the plurality of switches is controlled by one of a plurality of comparators that controls the switch on the basis of a comparison between the control voltage magnitude and a predetermined reference value. The switches are arranged to have different predetermined reference values, and so the number of switches closed is determined by the control voltage. As the control voltage is increased or decreased, the different reference values result in the switches switching sequentially. This arrangement minimises the component count and complexity.

Because of the sequential switching there is only one switch operating at any time in a voltage limit cycle mode, all of the others being either on or off. In this condition the voltage ripple is therefore nearly constant in amplitude and independent of load. Load changes only affect the frequency and duty cycle of the ripple.

Preferably, the sequentially switching shunt circuit uses semi-conductor switches with very low onimpedances. This means that the control process can be very efficient (of order 99%).

The switch controller preferably is part of two feedback loops: a fast reacting inner loop controlling the voltage at the common output of the solar array sections to be a target voltage and a much slower outer loop controlling this inner loop voltage by outputting a suitable signal for specifying the target voltage until the solar array is operating at the MPP. The inner loop may use hysteresis ripple voltage control so that it is very fast in its response to load current changes (of the order of tens of microseconds) and therefore only requires a low capacitance capacitor at the solar array output to keep the voltage constant and substantially noise free during these current or ripple changes. This results in fewer problems for the user of this output.

Figure 3:
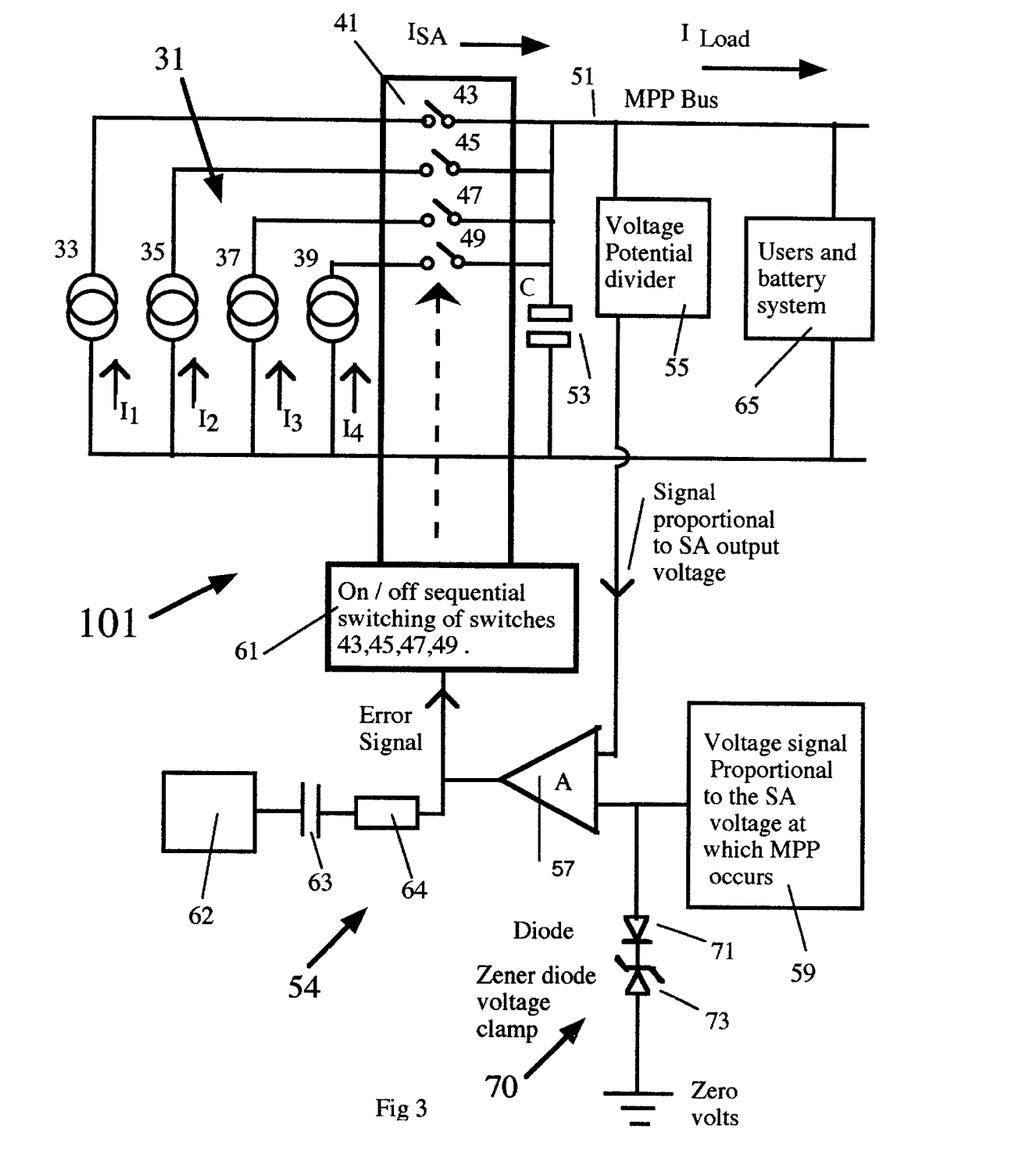
FIG. 3 shows a schematic diagram of a system according to an embodiment of the invention.

Since the inner loop controls the solar array output voltage, a predetermined voltage limit can be imposed on this control by the voltage clamp shown in FIG. 3. This limits to a more moderate and predetermined value the high target voltage that under certain conditions, such as a low temperature solar array, would be output by the outer control loop. This allows the equipment that interfaces with this solar array output to use lower voltage components, i.e. the section switches themselves, the output capacitor and all users of this power bus.

A further advantage of the reduction of this voltage variation is that boost regulators (with their inherently higher efficiency) can more easily be used to connect the solar array output to the user load. The large voltage variation of the solar array (and also the battery) in prior art MPP devices means that normally the only practical voltage regulator is a Buck configuration. Since boost converters are more efficient than Buck converters the embodiments of the invention have much higher efficiency.

If some operation in the absence of sunlight (eclipse operation) is required, the arrangement of the invention is used in combination with a battery. Prior art MPP arrangements required a highly specified battery design for MPP control as well as eclipse and pulse load requirements. The present invention on the other hand does not use the battery for MPP control, but only to provide additional power when it is needed. This relaxes the required specification of the battery, increases its lifetime and also simplifies the battery management logic.

According to a second aspect of the invention, a method of regulating a solar array having a plurality of sections connected to a bus through corresponding switches is described, comprising evaluating the power output of at least one section of the solar array, comparing the measured power output with the maximum power point of the sections of the solar array, and controlling the switches to vary the number of sections connected to the bus to maintain the connected sections of the solar array at their maximum power point.

BRIEF DESCRIPTION OF THE DRAWINGS

Specific embodiment of the invention will now be described with reference to the accompanying drawings, in which.

DESCRIPTION OF EMBODIMENTS OF THE INVENTION

Referring to FIG. 3, a switching MPP tracker 101 will now be described. A solar array 31 is shown divided into a plurality of array elements 33, 35, 37, 39. In this schematic diagram the total solar array is shown divided into only four equal sections for simplicity. Normally there are many more, depending on the power required.

Each section is connected through a common sequential switched shunt regulator 41 having an array of individual switches 43, 45, 47, 49 connecting corresponding array elements 33, 35, 37, 39 to a bus 51. The sequential switched shunt regulator 41 also comprises a sequential switching logic circuit 61. The term "shunt" in "sequential switching shunt regulator" is not intended to be limiting. Although the switches are shown as series switches, shunt switches such as described in U.S. Pat. No. 4,186,336 (Weinberg et al) can also be used, which short non-selected solar array sections to ground. This latter approach requires a series diode between the switches and the output bus 51. The bus 51 has a smoothing capacitor 53 connected in parallel.

A switch controller 54 is provided, comprising a voltage potential divider 55, an error amplifier 57, a maximum power point evaluation system 59, an optional sawtooth generator 62, and an optional maximum voltage clamp circuit 70.

The voltage potential divider 55 measures a proportion of the voltage output by the solar array, and is connected to one input of the error amplifier 57. The error amplifier 57 is a differential amplifier. The other input of the error amplifier is connected to the maximum power point evaluation system 59 that outputs a signal corresponding to the solar array output voltage at which the maximum power is produced by the array sections at the prevailing conditions of temperature, illumination, age or other deterioration of the array. The maximum power point occurs when operating the solar array at this output voltage; the signal output by the maximum power point evaluation system 59 is preferably a computed target voltage proportional to the solar array output voltage at the maximum power point. The maximum voltage clamp circuit 70 comprising a zener diode 73 and a diode 71 is used to limit the target voltage to a predetermined value. This prevents the solar array output voltage going to too high a value as discussed later with reference to FIG. 8. It should be noted that during voltage clamping the solar array will not operate at its MPP.

The maximum power point evaluation system 59 includes, for example, a solar cell array reference network as described in U.S. Pat. No. 3,696,286 "System for detecting and utilizing the maximum available power from a Solar cells" (inventor L.A. Ule). The disclosure of U.S. Pat. No. 3,696,286 is incorporated by reference herein As an alternative to measuring the maximum power point in this way, the maximum power point can also be computed, for example based on look-up tables, commands from the ground or measurements of other parameters.

The output of the error amplifier is a single voltage ($V_c$) that controls the sequential switching logic circuit 61.

An oscillator in the form of a sawtooth signal generator 62 is provided in the described embodiment for constant frequency operation at the oscillator frequency (pulse width modulation). The maximum power point circuit will operate without the sawtooth signal generator. A sawtooth voltage is injected through a capacitor 63 and a resistor 64 into the error signal input to the sequential switching logic circuit. The output ripple caused by the switching will then be at the same frequency as the frequency of the sawtooth.

The amplifier 57, voltage detector 55 and sequential switching logic circuit 61 together constitute a means for controlling the switches based on the signal output by the maximum power point evaluation system 59. A digital circuit could also be used, especially if the output from the maximum power point evaluation system 59 is arranged to be digital.

The bus 51 is connected to a user load 65 consisting of all users including the battery system.

In use, the load 65 discharges the capacitance 53 whilst at the same time the capacitance is charged by those sections of the solar array 31 that are connected to the bus 51. Therefore if the total solar array current ($I_{SA}$) is greater than the total load current ($I_{LOAD}$) then the voltage of the solar array bus increases and the operating point of the solar array moves clockwise around the solar array characteristic (see FIG. 1). If $I_{SA}$ is less than $I_{LOAD}$ then the solar array voltage decreases and the operating point moves anticlockwise around the solar array characteristic. Therefore, by controlling the value of $I_{SA}$ i.e., the number of switches in the ON state, the solar array can be operated at any point in its solar array characteristic.

For a given load condition, the actual voltage and a reference voltage output by the maximum power point evaluation system 59 and corresponding to the maximum power point are compared using the differential error amplifier 57 and the error signal is used to operate the switches 43, 45, 47, 49 sequentially until the solar array voltage is equal to the computed MPP reference voltage. This means that the solar array section(s) that have their respective switches closed and hence are connected to the bus 51 are operating at their MPP. The solar array sections that are not connected contribute no power to the bus. One section of the solar array will be switching continuously to finely regulate the solar array output voltage. The loop comprising the switches 43,45,47,49, voltage potential divider 55, amplifier 57 and switch controller 61 constitutes a fast, inner, feedback loop.

The loop including the maximum power point evaluation system 59 measuring the reference voltage corresponding to the maximum power point constitutes an outer feedback loop that normally by its nature has a much slower response time than the inner feedback loop.

The two feedback loops need not be implemented as separate hardware loops. It is possible to provide a switch controller having inputs from the reference network and the voltage on the output bus, and outputting the control voltage. This arrangement is particularly suited to digital calculation of the control voltage, using a microprocessor or similar computer, together with suitable D/A and A/D converters.

In embodiments that do not use a sequential switching shunt regulator, but another kind of switch array, it is necessary to provide suitable outputs, possibly multiple outputs, to control the switches. Digital control is particularly suitable for these arrangements.

Figure 4:
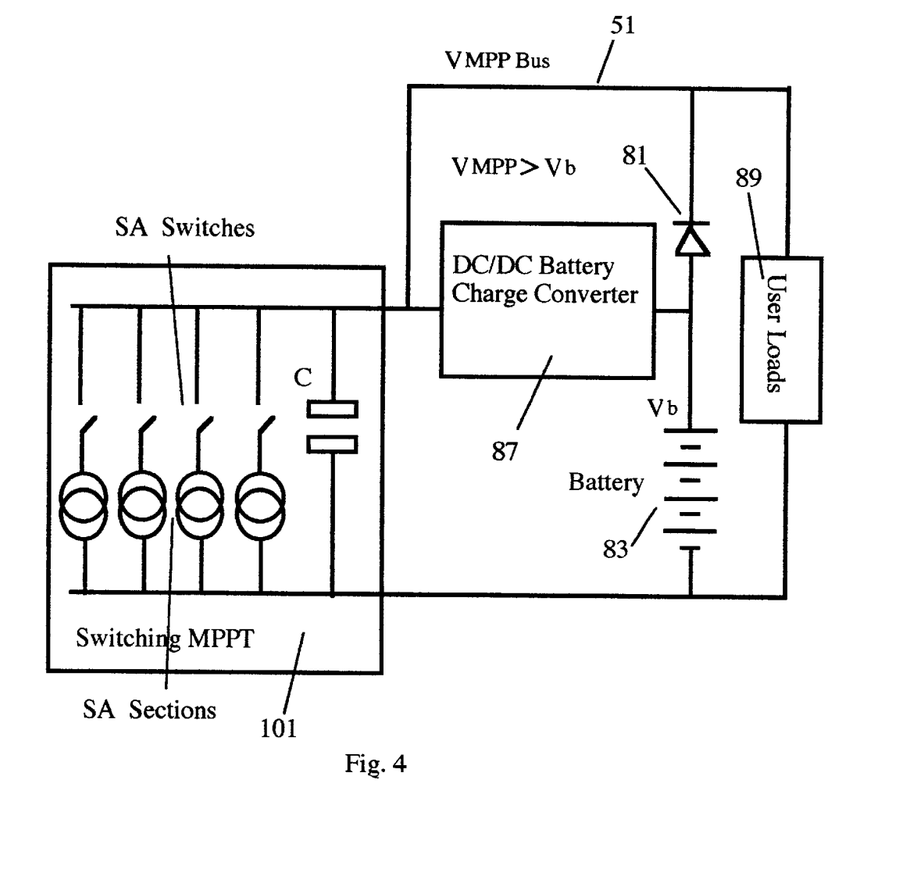
FIG. 4 shows a diagram of a full system according to a preferred embodiment of the invention.

FIG. 4 shows the preferred arrangement of a power subsystem using the above MPP tracking technique. In sunlight the switching MPP tracker 101 controls the output voltage to operate at the MPP of its characteristic which is designed always to be above that of the maximum battery voltage. Because of this fact the diode 81 is reversed biased preventing the battery 83 from supplying the user load 89, these loads being supplied from the output bus 51. In eclipse the sunlight and therefore the solar array power disappears and the user load 89 can be supplied by the battery 83 through the diode 81. When sunlight returns the battery is recharged by the converter 87 from the solar array output bus 51. Because of the S3R operation the output impedance of the MPP Bus is very low such that any load demands up to the full MPP power capability of the solar array is drawn directly from the solar array via the switching tracker 101 and not through battery and DC to DC converters as the prior art solution.

Figure 5:
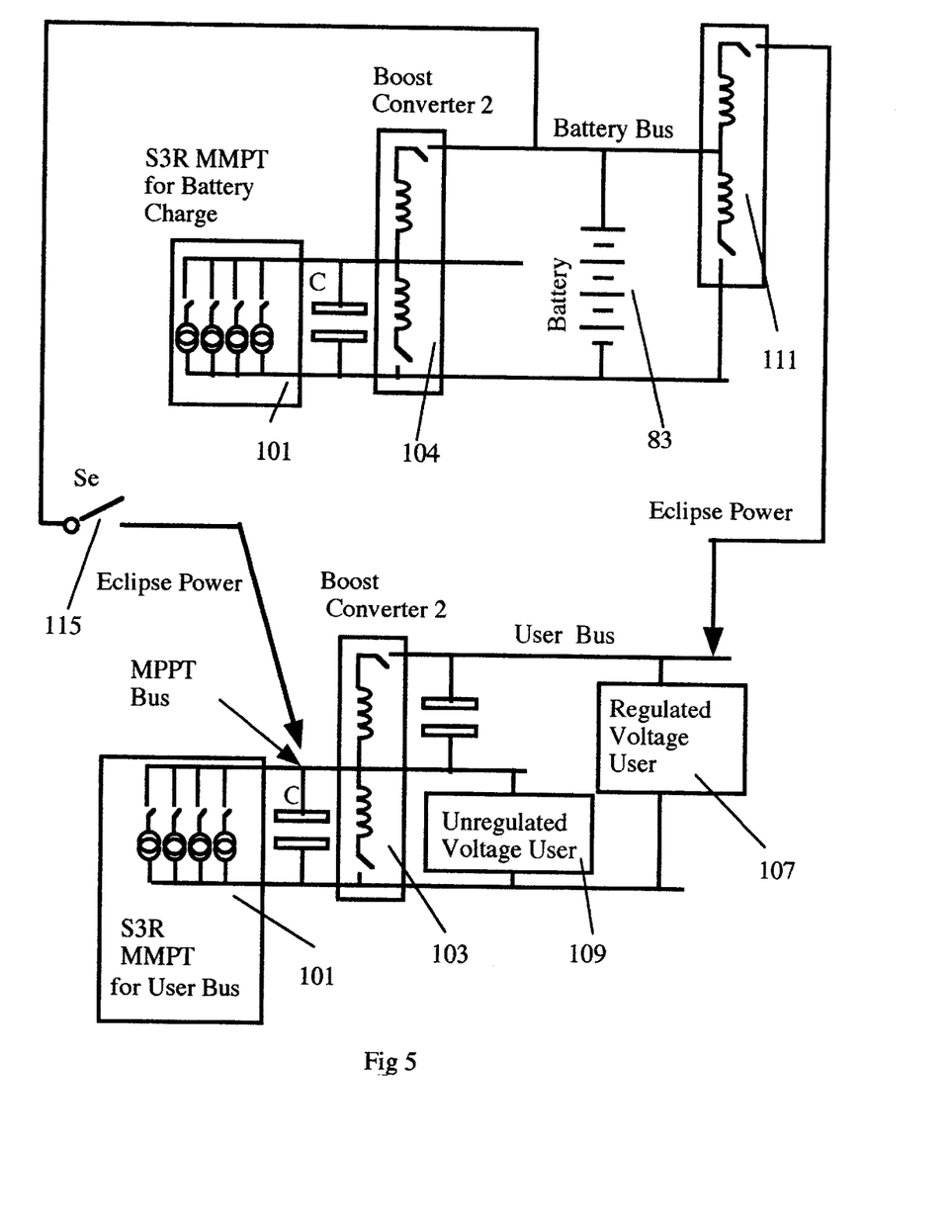
FIG. 5 shows a diagram of a full system according to a second embodiment of the invention.

FIG. 5 shows a typical power subsystem according to a rather more complicated second embodiment. The two regulated solar power sources 101 are as described above with reference to FIG. 3. Each is connected to a DC-DC boost converter 103,104, as will be described in more detail below. Two boost converters are efficient up-converting voltage regulators, producing regulated current to charge the battery 83 and a constant voltage to supply the regulated user load 107. Some subsystems do not require a constant voltage and these subsystems make up the unregulated user load 109 that is connected directly to the output of the solar power source 101. This is possible, because the output from the solar power source 101 can be fairly well controlled (unlike prior art techniques) and thus the unregulated voltage user load can be connected directly if it can tolerate its voltage variation. The advantage of using the DC/DC Boost Converter rather than a buck converter is that it only has to convert part of the total user power and is therefore more efficient. The same applies to the battery charging. The battery 83 and regulated user load 107 operate from separate solar power sources driven by different solar array sections. During eclipse operation the battery supplies the unregulated user bus using the switch 115, and the regulated user bus via the Boost Converter 111.

Figure 6:
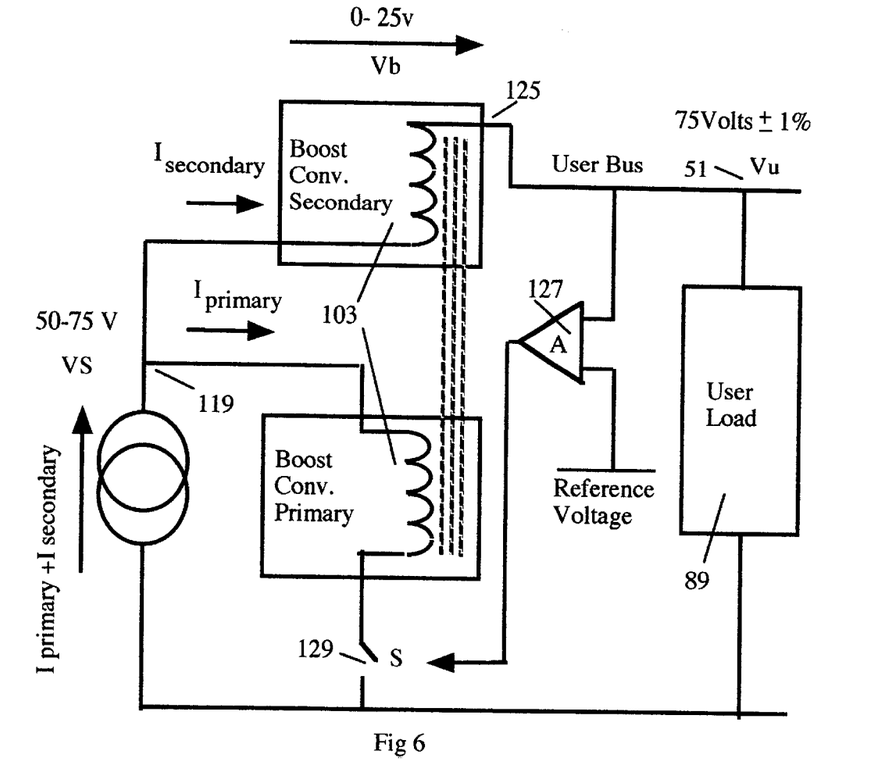
FIG. 6 shows a schematic diagram of a boost converter.
Figure 7:
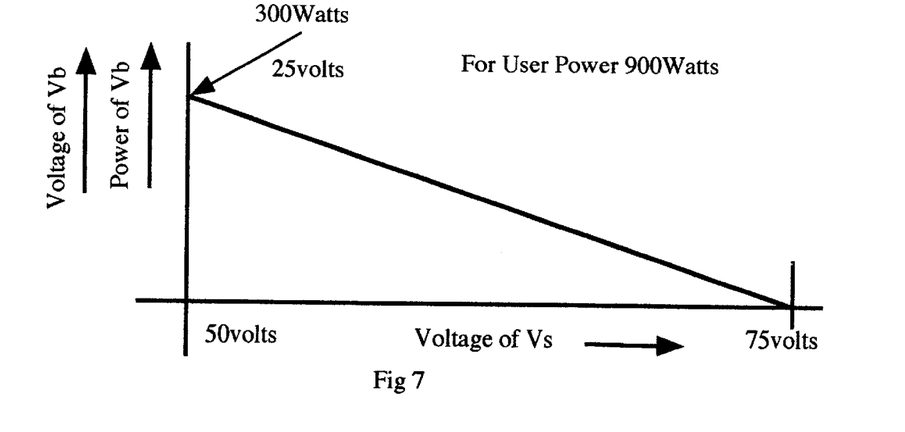
FIG. 7 shows the power and voltage of the boost converter as a function of the input voltage.

The DC/DC Boost Converter 103 will now be described with reference to FIGS. 6 and 7. The boost concept is quite simple and its principle is shown in FIG. 6 in which the input 119 has a voltage $V_s$ supplied which varies in this example from 50 to 75 volts. A DC/DC boost converter 103 whose output $V_b$ can be varied 0 to 25 volts is connected in series between the input 119 (here represented as a voltage source) and the output 125. A differential amplifier 127 senses the voltage $V_u$ at the output bus 51 and compares it with a reference voltage Vref. The amplifier 127 controls the switch 129 using pulse width modulation (PWM) to control the output voltage $V_b$ of the boost converter supply 103 to keep the user bus voltage 51 ($V_u$) constant. Note that the boost converter adds a voltage to the input voltage.

Suppose $V_u$ needs to be at a constant 75 volts, powering a load requiring a constant 900 W. Under these conditions, if at any time $V_s$ is 5.0 volts then $V_b$ has to be 25 Volts and if $V_s$ is 75 volts $V_b$ has to be zero volts. The voltage requirement for $V_b$, as a function of the voltage of $V_s$ is shown in FIG. 7. Since the user load is assumed constant at 900 Watts and its voltage is constant then the current passing through $V_b$ is also constant. The power delivered by the power supply therefore scales with the voltage, and so it is represented by the same line on the graph. The maximum power supplied by the controlled power supply is 300 Watts at $V_s=50V$.

This power is generated by the DC to DC Boost converter 103 which consists of a primary and secondary part, each part being electrically isolated from each other by the use of an isolating transformer. The power for the converter comes from the primary and is transmitted through the isolation transformer. The boost converter 103 is a switched converter.

In this specific example the converter has to supply only 300 Watts peak (150 Watts average over the voltage range) for a total throughput power of 900 Watts. If the conversion efficiency of boost converter 103 is 90% then the overall efficiency will be 96%, since the boost converter only has to supply at most a third of the output voltage and hence at most a third of the power. When compared with a converter that has to handle the total user load a gain of 6% is established. Also, a converter handling one third of the power can have a much lower cost and mass.

Figure 8:
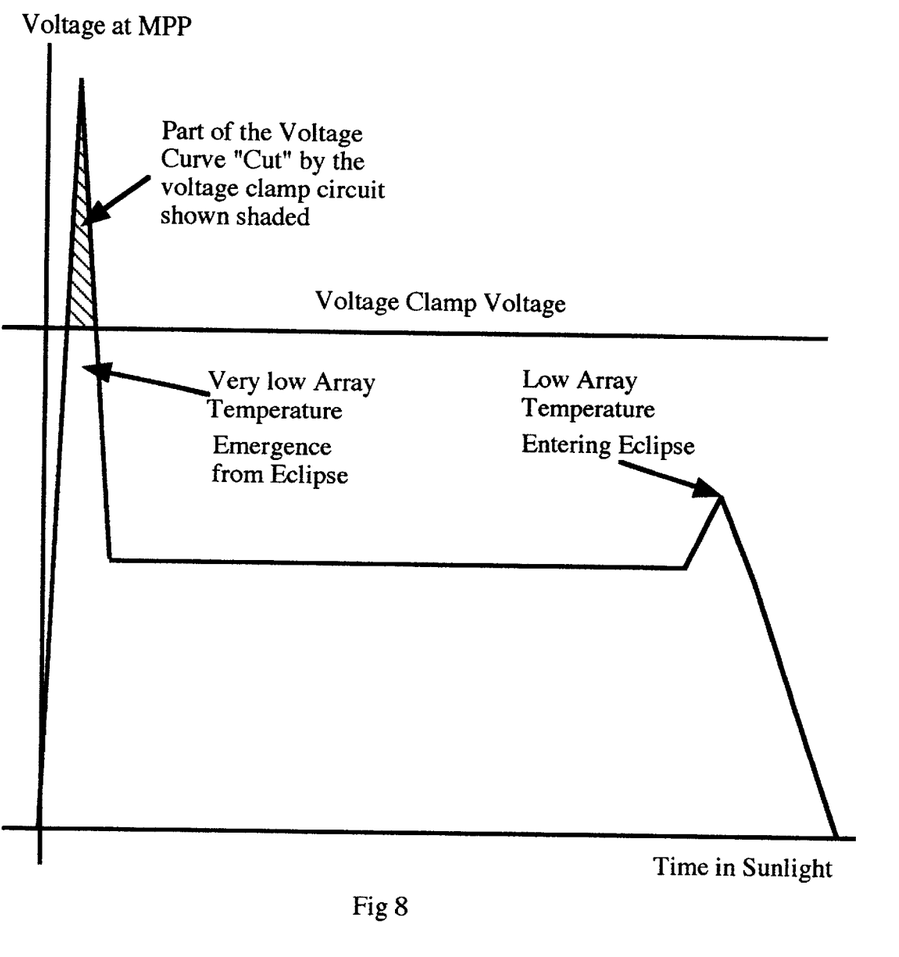
FIG. 8 shows a typical voltage profile for one sunlight period.

FIG. 8 shows the typical clamping action on the output characteristic of a solar power source 101 mounted in a satellite as a function of time. The zero of the horizontal time axis corresponds to the satellite leaving an eclipse. As it leaves the eclipse, the voltage rises rapidly, held at the maximum power point by the circuitry described. The voltage clamping circuit 71, 73 in the outer feedback loop of the MPP detector (see FIG. 3) prevents the voltage rising above the voltage clamp voltage during this period. After some time when the sun warms up the solar array, the voltage reduces and is held at a voltage corresponding to the maximum power point, which will depend, for example on the temperature of the solar array and the amount of radiation damage to it, i.e., how long the satellite has been in orbit. As the satellite enters eclipse again, the voltage rises briefly before falling to zero.

Figure 9:
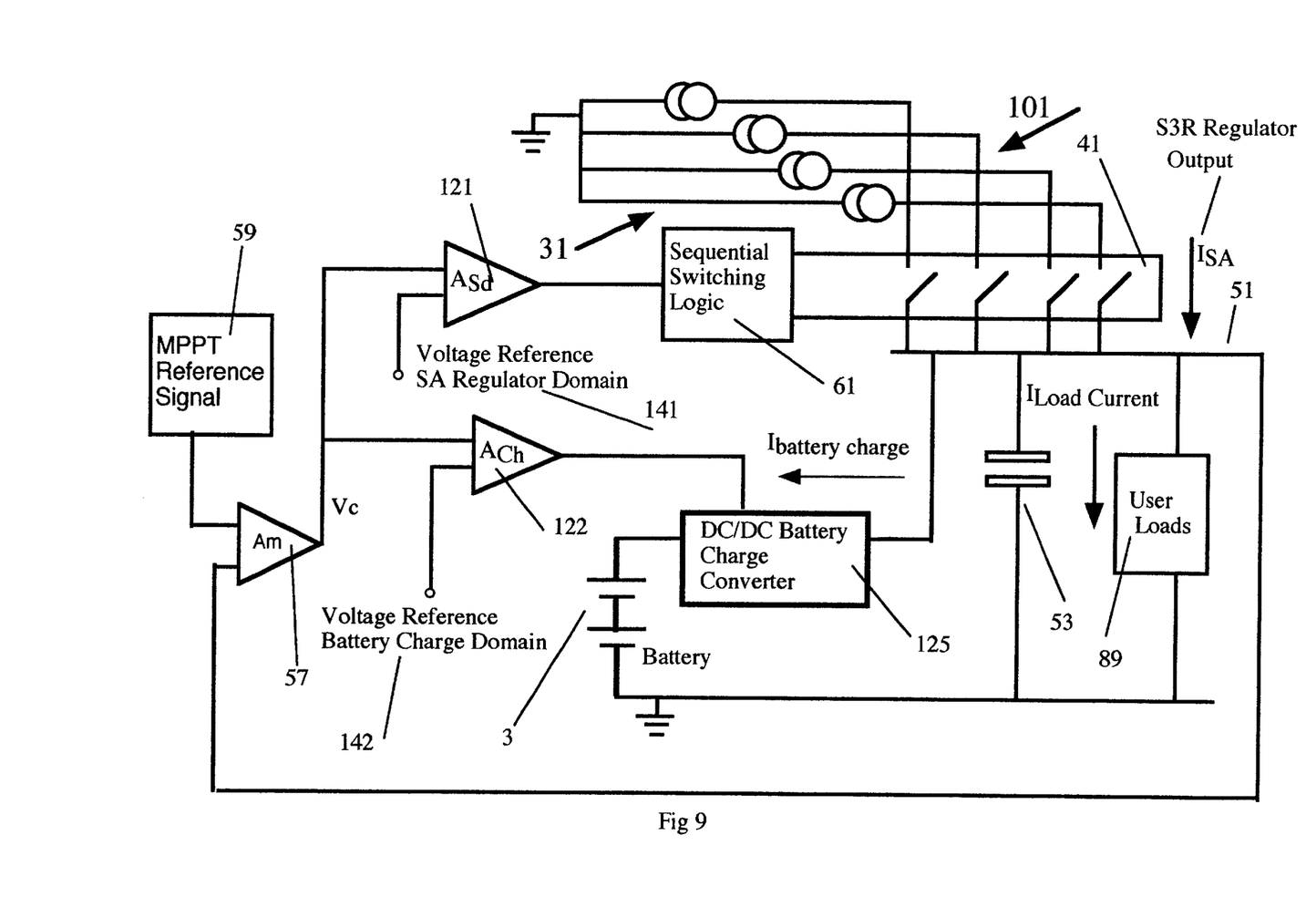
FIG. 9 shows a diagram of a system according to a third embodiment of the invention.

In another embodiment, illustrated in FIG. 9, voltage domain control is used for the MPPT to improve considerably the transient response during peak power demand. FIG. 9 shows a two-domain approach, but additional domains could be used to control other equipment connected to the bus.

In the illustrated embodiment, second 121 and third 122 differential amplifies are placed in the feedback loop, after the first, main, amplifier 57. Each of the second and third amplifiers has a common input signal Vc, which is the output of the first amplifier. Voltage references 141,142 are connected to the other inputs of the second and third amplifiers. The voltages output by the voltage references and present at the inputs of the second and third amplifiers determine the range of voltage Vc output by the first amplifier at which the respective amplifier starts to operate in its linear mode. The absolute voltage range required at the input of an amplifier to vary its output from a minimum saturated voltage to a maximum saturated voltage is defined, in this case, to be the domain of the amplifier. The domains of the second and third amplifiers are set so that they do not overlap, so the common input signal Vc causes only one of these amplifiers to operate within its linear range at any one time. The fact that the domains do not overlap makes feedback control easier, but is not in fact necessary. The other of the second and third amplifiers is saturated and unable to play a part in the control loop. Therefore, the signal Vc which acts as a feedback loop control signal will be located in one domain only and that domain is dictated by the power balance on the output power bus.

The major advantage of using domain control with the present system is that peak power transient can easily be supplied in a natural and fast way. This is explained with reference to FIG. 10. Consider the case that the system initially supplies an output current Iu, and in this state the output Vc of the main amplifier 57 is a voltage V1. If a sudden large current demand is made by the user, increasing the load current from its nominal value Iu to Iu+ΔIu, then the voltage on the output bus falls and the main amplifier 57 moves its output voltage Vc downwards from the nominal value V1. Whilst this output voltage remains in the domain of the second amplifier the second amplifier reduces its output, switching ON solar array sections in order to provide more power to satisfy this peak power demand.

Figure 10:
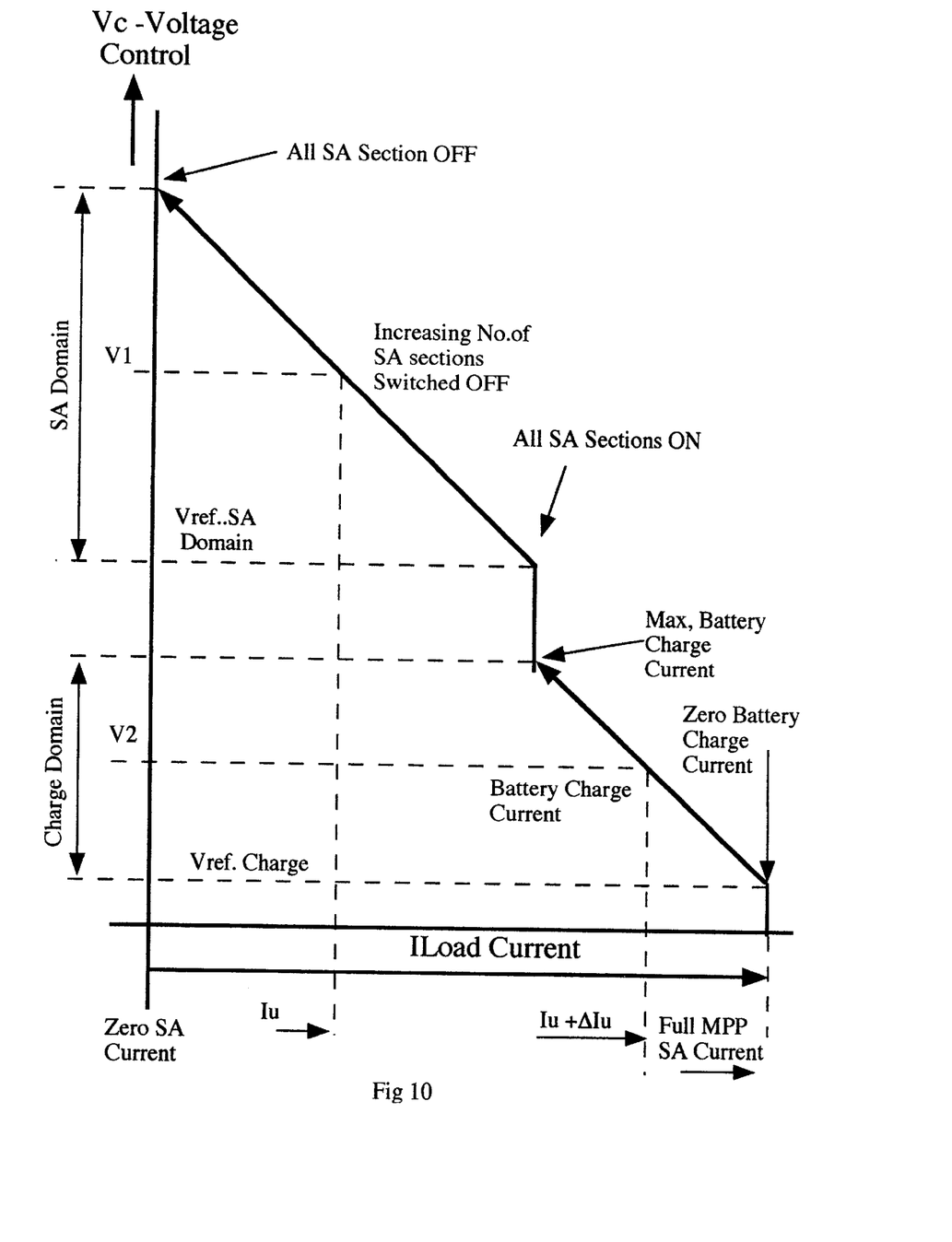
FIG. 10 is a graph illustrating the two voltage domains used in the third embodiment.

When all the sections are ON the shunt domain feedback loop cannot provide more power. If the power demand is still not satisfied, the output bus voltage drops further causing the voltage Vc output by the main amplifier to reduce until it reaches the domain of the third amplifier. This then outputs a signal to reduce battery charging, giving more power to the user load, thereby increasing the output bus voltage until a power balance is reached and the solar-array sections are operating at their maximum power point once again.

Due to the high gain of the main error amplifier 57, the resultant output bus voltage variation is usually less than 1% for a variation of Vc from its maximum value to its minimum. This gives a low output impedance and in addition, keeps the solar array essentially at its MPP, even with very high peak power demands.

Figure 11:
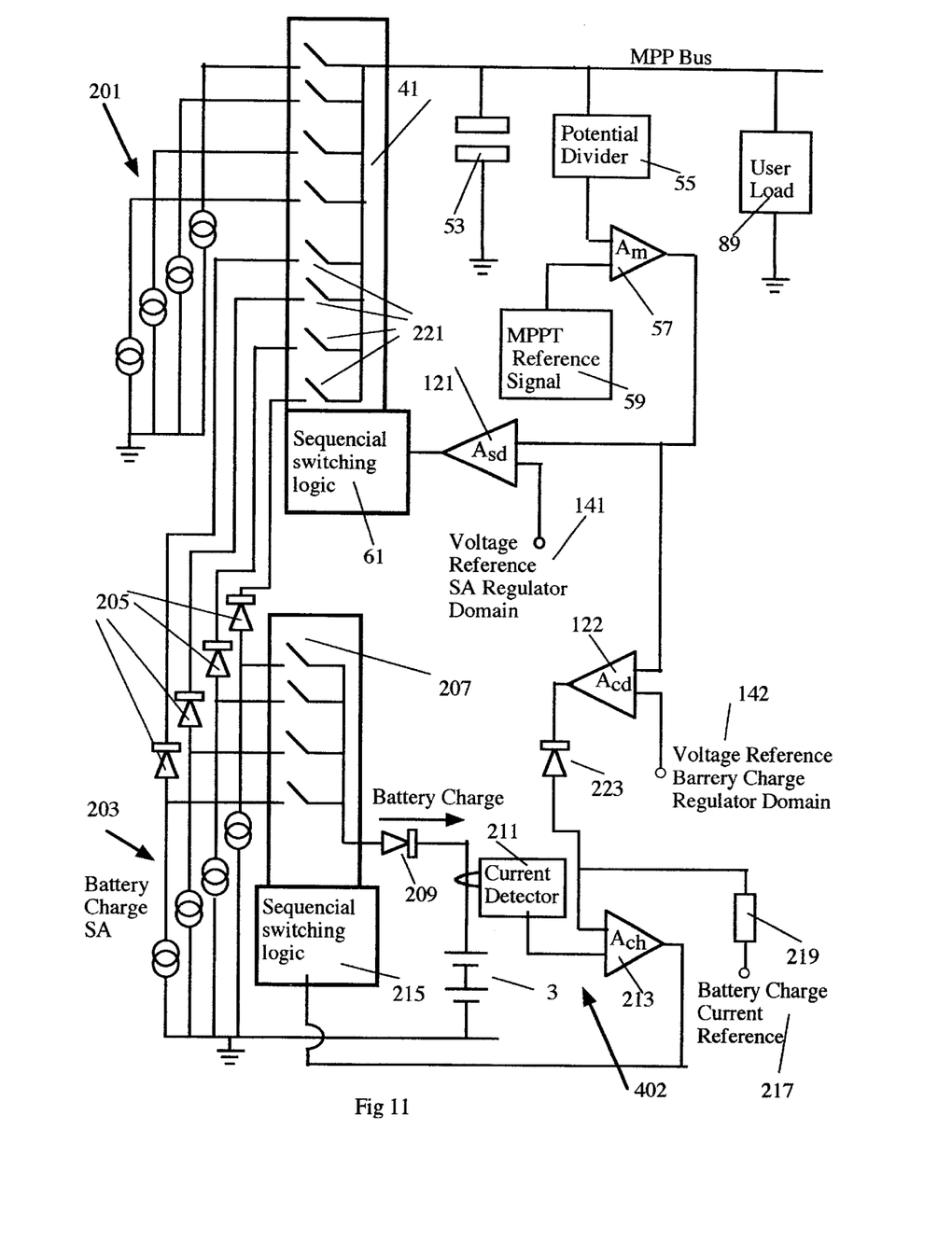
FIG. 11 shows a schematic diagram of a system according to a fourth embodiment of the invention.

In a fourth embodiment, illustrated in FIG. 11, a sequential switching shunt regulator (S3R) (of the type already used for the solar array regulator) is used as the battery charge circuit instead of the DC/DC battery charge converter 125 of FIG. 9. This reduces the mass and cost of the system.

In this fourth embodiment, the solar array is divided into two regions, a first region 201 for supplying power to a user load and a second region 203 for supplying power normally used to charge a battery 3.

The sections of both regions are connected to the output bus 51 through individual switches in a first sequential switched shunt regulator 41. The switches are controlled by the output of the second amplifier 121 and sequential switching logic 61 as explained with reference to the embodiment of FIG. 9.

A second sequential switched shunt regulator 207 comprising a plurality of individual switches connects the solar array sections of the second region to the battery 3 through a diode 209. The inner feedback loop includes a current detector 211 which feeds into a fourth amplifier 213 which compares the output of the current detector 211 with the output of the battery charge current reference 217. The fourth amplifier 213 then controls second switching logic circuit 215. This loop controls the battery charging current.

The other input to the fourth amplifier is the output of the third amplifier 122, which is connected to the output of the first, main amplifier 57 in the same way as in the third embodiment, i.e., using a different voltage domain. The output of the third amplifier is combined with the output of a battery charge reference 217 that is connected to the input of the fourth amplifier through a suitable resistor 219.

With nominal conditions, the solar array sections of the first region 201 provide power to the users and the solar array sections of the second region 203 provide power to charge the battery.

If, however, the user load increases its power demand above the power that can be supplied by the first region 201, the main amplifier 57 adjusts its voltage output voltage V1, until it falls within the charge domain of the third amplifier 122. The output of the third amplifier 122 falls, reducing the charge current reference voltage, at the input of the fourth amplifier (the resistor 219 and diode 223 allow this action to take place).

This progressively reduces the battery charge current by disconnecting sections of the second region 203 from the battery 3 by means of switches in the second sequential switching shunt regulator 207 and control logic in the second sequential switching logic circuit 215.

The diodes 205 allow the current from sections of the second region to flow to the output bus when that section is disconnected from the battery charge circuit. Since the output bus voltage is designed to be at a voltage above that of the battery, these diodes prevent current flowing from the output bus to the battery.

Switches 221 in the first sequential switched shunt regulator 41 take care of the case when the battery is fully charged or disconnected for reconditioning purposes. In this case, all the switches of the second sequential switching shunt regulator 207 are OFF and the main regulator 41 has to control the power flowing from the second region 203 to the output bus in order to properly maintain MPP regulation.

The diode 209 prevents current flowing from the battery to the output bus in the event that the output bus goes below the voltage of the battery. This can occur during a short circuit overload. If correct protection is used, such as fuses, this fault will clear after a short duration of time and the output bus 51 will recover to its nominal operating point.

This method of providing peak power demands is very attractive because the extra power for this demand comes from the second region 203 of the solar array and no special over-sizing of the total array has to be made. The only impact this power demand has on the power system is to stop battery charge during the period of the high demand. Since this demand is normally of short duration, then battery charge can be made up after the power demand disappears.

The system is not limited to systems that are only capable of operating as described. The system may also have other modes of operation, such as constant voltage or constant power or constant maximum power. This can be achieved very simply by imposing another signal to override that of the output of the MPP detector 59 in FIG. 3.

For example during the first years of a satellite's life the solar array output is high and therefore it could be an advantage, as far as the users are concerned, to operate the solar array output at constant voltage. As the solar array degrades, for example due to radiation effects, the solar array produces less power so that the solar array could then be commanded by an on-board computer or ground control to operate at the MPP of the solar array.

Another example would be an interplanetary mission where the satellite goes to several sun distances away from the sun and therefore the power of the solar array will decease accordingly with time Advantages of the invention will now be briefly summarised.

1) The efficiency of transfer of power from the solar array to the load is very high, of the order of 99%, leading to a smaller solar array for a given load power.

2) Because of the low dynamic output impedance of the switching MPPT any peak power transient can be supplied directly from the solar array resulting in much less use of the battery and therefore increasing the battery's lifetime and decreasing its mass and cost.

3) The DC/DC converter has to provide the battert recharge power after eclipse. Prior art converters have to provide both the recharge power after eclipse and the user load power this results in a much larger and more expensive DC/DC converter, than that used for the invention, which accordingly reduces the cost and mass.

4) The control of battery charge and MPPT are independent resulting in very simple control circuits, reducing cost and increasing reliability, and avoiding loss of the MPP control during battery reconditioning or when the battery is fully charged.

5) By means of the voltage clamp the electrical component connected to the solar array MPP bus are not subjected to the high voltage otherwise seen by prior art techniques, this reduces cost and mass.

What is claimed is:

1. A solar array system, comprising:
   a solar array having a plurality of array sections, the array sections being capable of producing a maximum output power as a function of output voltage, at a maximum power point;
   an output bus;
   a plurality of switches switchably connecting respective array sections to the output bus; and
   switch controller means for controlling system power output from the solar array system by operating the switches to vary the number of array sections connected to the output bus, such that system power output matches load power demand on the bus, and such that those solar array sections that are connected to the output bus are at their maximum power point.

2. A solar array system according to claim 1, wherein the switch controller comprises
   a maximum power point evaluation system for outputting a signal specifying a target voltage proportional to the output voltage of the solar array sections at the maximum power point of the solar array sections, and
   an amplifier for outputting a signal proportional to the difference between the target voltage and the voltage on the output bus.

3. A solar array system according to claim 2, further comprising an oscillator for providing a signal at an oscillator frequency that is added to the output of the amplifier to operate the switches at the oscillator frequency.

4. A solar array system according to claim 2, wherein a voltage clamp is provided to limit the signal for specifying the target voltage to a predetermined maximum value.

5. A solar array system according to claim 1, wherein the switch controller has a first feedback loop, controlling the voltage on the output bus to be a target voltage, and a second, slower, feedback loop, controlling the target voltage to be a voltage corresponding to the maximum power point of the individual sections of the solar array.

6. A solar array system according to claim 1, wherein
   the solar array system further comprises a rechargeable battery,
   the solar array is divided into a first region for supplying power to the output bus, and a second region for supplying power to the rechargeable battery or to the output bus, and
   a battery charge circuit connected to the solar array sections of the second region is provided for recharging the rechargeable battery.

7. A solar array system according to claim 6, wherein the battery charge circuit is a sequential switching shunt regulator comprising a plurality of switches switchably connecting the solar array sections of the second region to the battery.

8. A solar array system according to claim 1, wherein the switch controller comprises
   a maximum power point evaluation system for outputting a signal specifying a target voltage proportional to the output voltage of the solar array sections at the maximum power point of the solar array sections,
   a first differential amplifier for outputting a signal proportional to the difference between the target voltage and the voltage on the output bus, and
   second and third differential amplifiers each having one input connected to the output of the first differential amplifier, the second and third amplifiers having non-saturated outputs in first and second input voltage domains respectively,
   and the solar array system further comprises
   a rechargeable battery,
   a sequential switching logic circuit controlled by the output of the second differential amplifier for controlling the said plurality of switches, and
   a battery charge circuit for charging the battery, the battery charge circuit being controlled by the output of the third differential amplifier.

9. A solar array system according to claim 8 wherein the first and second domains do not overlap.

10. A solar array system, comprising:
   a solar array having a plurality of array sections, the array sections being capable of producing a maximum output power, as a function of output voltage, at a maximum power point;
   an output bus;
   a sequential switching shunt regulator having a plurality of switches switchably connecting a number of array sections to the output bus controlled by a control voltage; and
   switch controller means for varying the control voltage to control the number of array sections connected to the output bus, such that system power output matches load power demand on the bus, and such that those solar array sections that are connected to the bus are at their maximum power point.

11. A solar array system according to claim 10, wherein the sequential switching shunt regulator comprises a comparator for each switch, each comparator controlling the switch on the basis of a comparison between the control voltage and a predetermined reference value, and
   the predetermined reference value is different for each comparator so that the number of switches closed is controlled by the control voltage.

12. A solar array system according to claim 11, further comprising a capacitor connected across the output bus.

13. A solar array system according to claim 12, wherein the switch controller comprises
   a maximum power point evaluation system for outputting a target voltage proportional to the output voltage of the solar array sections at the maximum power point of the solar array sections, and
   an amplifier for outputting a signal proportional to the difference between the target voltage and the voltage on the output bus.

14. A solar array system according to claim 13, wherein a voltage clamp is provided to limit the target voltage to a predetermined maximum value.

15. A solar array system according to claim 10, further comprising an oscillator for providing a signal at an oscillator frequency that is added to the output of the amplifier to operate the switches at the oscillator frequency.

16. A solar array system according to claim 10, wherein the switch controller is part of a first feedback loop, controlling the voltage on the bus to be a target voltage, and a second, slower, feedback loop, controlling the target voltage to be a voltage corresponding to the maximum power point of the individual sections of the solar array.

17. A solar array system according to claim 10 wherein
   the solar array system further comprises a rechargeable battery,
   the solar array is divided into a first region for supplying power to the output bus, and a second region for supplying power to the rechargeable battery or to the output bus, and
   a battery charge circuit connected to the solar array sections of the second region, for recharging the rechargeable battery.

18. A solar array system according to claim 17, wherein the battery charge circuit is a sequential switching shunt regulator comprising a plurality of switches switchably connecting the solar array sections of the second region to the battery.

19. A solar array system according to claim 10 wherein the sequential switching shunt regulator comprises
   a maximum power point evaluation system for outputting a signal specifying a target voltage proportional to the output voltage of the solar array sections at the maximum power point of the solar array sections,
   a first differential amplifier for outputting a signal proportional to the difference between the target voltage and the voltage on the output bus, and
   second and third differential amplifiers each having one input connected to the output of the first differential amplifier, the second and third amplifiers having non-saturated outputs in first and second input voltage domains respectively,
   and the solar array system further comprises
   a sequential switching logic circuit controlled by the output of the second differential amplifier for controlling the said plurality of switches such that the number of switches closed changes as the output of the first differential amplifier varies in the first domain, and
   a battery charge circuit for charging the battery, the battery charge circuit being controlled by the output of the third differential amplifier as the output of the first differential amplifier varies in the second domain.

20. A solar array system according to claim 19 wherein the first and second domains do not overlap.

21. A solar array system, comprising:
   a solar array having a plurality of array sections, each array section having a maximum power point;
   an output bus;
   a switching regulator having a plurality of switches, each switch between an array section and the output bus; and switch controller means, having an output coupled to the switches, for controlling system power output from the solar array system by switching selected array sections to the output bus and by switching non-selected array sections into a no-power state, such that system power output matches load power demand on the bus, and such that each selected array section operates at its maximum power point.

22. A solar array system according to claim 21, wherein non-selected array sections are open-circuited.

23. A solar array system according to claim 21, wherein non-selected array sections are short-circuited.

24. A solar array system according to claim 21, further comprising a maximum power point evaluation system having an input coupled to the output bus and an output coupled to deliver a control signal to the switch controller means.

25. A solar array system according to claim 24, wherein the control signal is a digital control signal.

26. A solar array system according to claim 21, wherein system power output matches load power demand over a range from zero to maximum system power output.

* * * * *